United States Patent

Huff

Patent Number: 5,363,802
Date of Patent: Nov. 15, 1994

[54] GNAW RESISTANT ANIMAL WATERING BOTTLE

[75] Inventor: Marvin E. Huff, Union City, Calif.

[73] Assignee: Novalek, Inc., Hayward, Calif.

[21] Appl. No.: 225,957

[22] Filed: Apr. 11, 1994

[51] Int. Cl.$^5$ .............................. A01K 7/00
[52] U.S. Cl. ........................ 119/18; 119/72.5
[58] Field of Search ................ 119/72.5, 18, 75

[56] References Cited

U.S. PATENT DOCUMENTS

| | | | |
|---|---|---|---|
| 3,529,575 | 9/1970 | Schalk | 119/72.6 |
| 3,897,751 | 8/1975 | Gullino et al. | 119/18 |
| 3,902,459 | 9/1975 | Huziker, Jr. | 119/18 |
| 4,574,733 | 3/1986 | Tominaga | 119/18 |
| 4,807,567 | 2/1989 | Atchley | 119/18 |
| 5,010,847 | 4/1991 | Braden | 119/18 |
| 5,301,634 | 4/1994 | Ho | 119/72.5 |

Primary Examiner—Paul J. Hirsch
Attorney, Agent, or Firm—Harris Zimmerman

[57] ABSTRACT

A water dispenser for attachment to an animal cage or the like has a bottle from which a drinking tube extends. The opening for filling the bottle is situated at the front wall of the bottle which faces the cage. In the preferred form, a threaded rim encircles the opening and a threaded closure cap engages on the rim. The bottle may be made of plastic while the closure cap is formed of metal or other relatively hard material. The protruding rim and hard closure cap hold the bottle away from the cage to prevent gnawing or clawing of softer portions of the dispenser. The frontal location also enables the opening to be large and thereby facilitates cleaning of the bottle. A resilient hanger rod clasps the rim of the opening and has outward extending hooked ends for engaging the cage. Also in the preferred form, gripping of the bottle is facilitated by recesses in the side walls which are adjacent a portion of the back wall that is of reduced width.

17 Claims, 3 Drawing Sheets

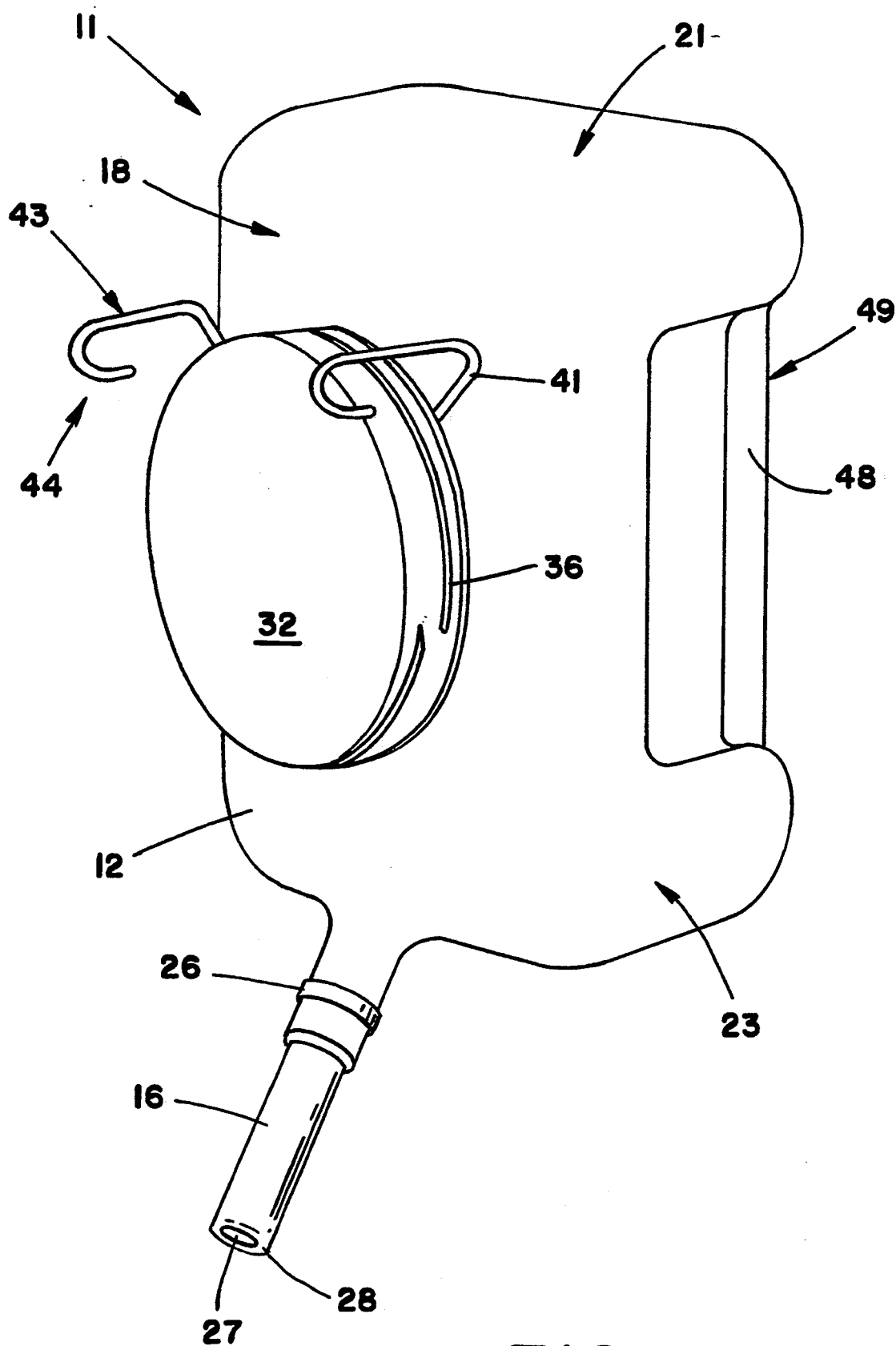
FIG_1

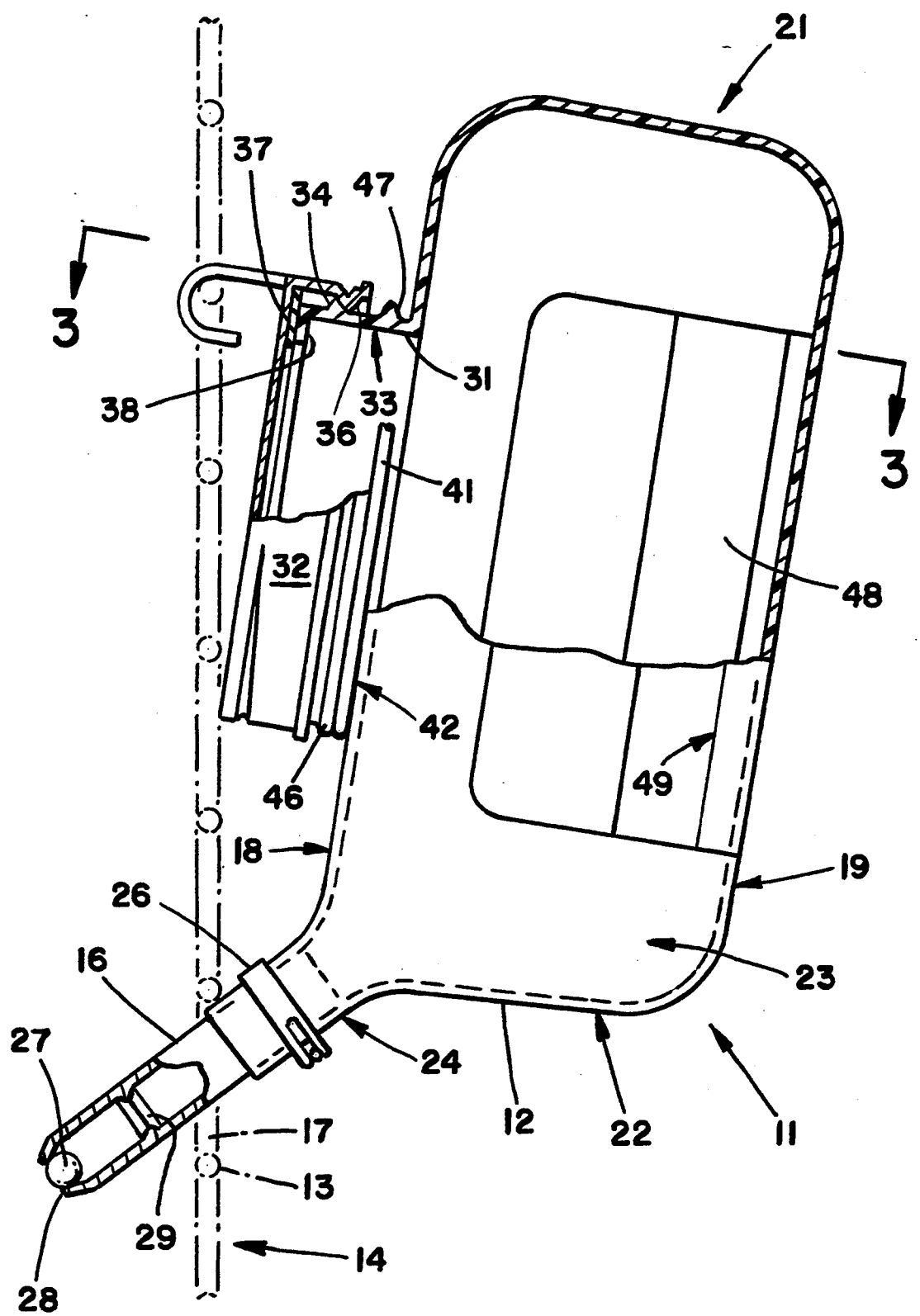
FIG_2

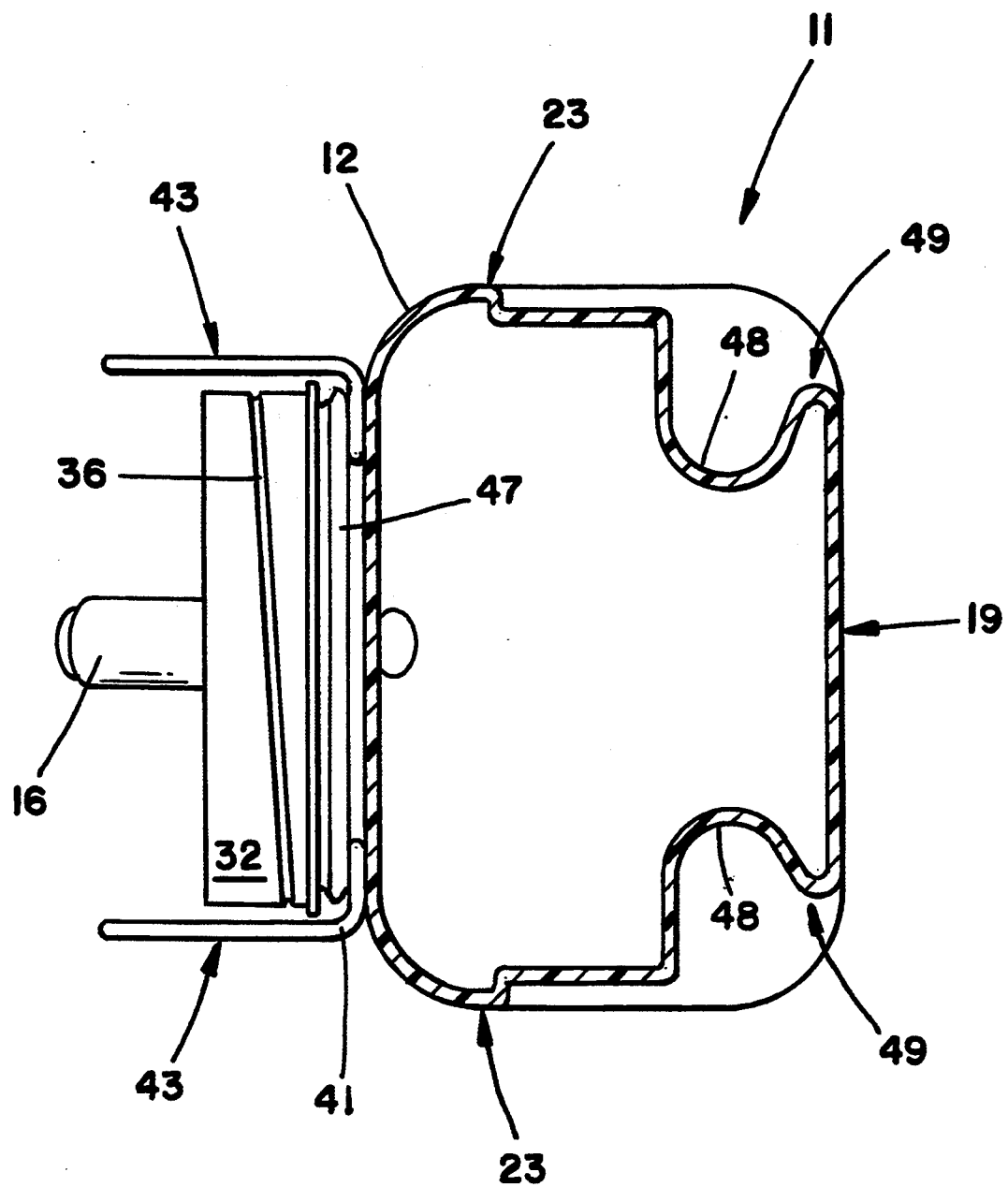
FIG_3

GNAW RESISTANT ANIMAL WATERING BOTTLE

TECHNICAL FIELD

This invention relates to apparatus for dispensing water or other liquids to animals and more particularly to animal watering bottles of the type that are hung on the wall of a cage or the like and which have a drinking tube that extends into the cage.

BACKGROUND OF THE INVENTION

Caged animals will often overturn, contaminate or damage a water dish. To avoid these problems, it is a common practice to use a water bottle which is attached to the outside of the cage and which has a drinking tube that extends a short distance into the cage. Prior water dispensers of this type are themselves subject to certain problems.

The traditional water dispenser includes a bottle which is inverted to locate the mouth of the bottle at the underside of the dispenser. The bottle is closed with a cap or cork and an angled drinking tube extends down through the cap or cork and then into the cage. A wire hanger extends around the bottle and suspends it from the wall of the cage.

The walls of many cages are formed of some kind of mesh which provides openings through which the animal can gnaw and/or claw the water bottle. This can damage the water dispenser to the extent that it becomes unusable. Glass bottles are resistant to that kind of damage but are breakable and are more costly than bottles formed of other materials such as various plastics.

Conventional water bottles have small mouths that are situated at one end of the longest dimension of the bottle. This complicates cleaning of the bottle. The conventional hanger wire or strap does not provide a positive fastening of the bottle to the cage. In some configurations, the hanger may easily be shifted and cause an undesired release of the bottle. In other instances the hanger complicates installation and removal of the bottle. When scaled up to larger sizes, the conventional water bottle can be difficult to grip with one hand while the other hand is being used to install or remove the closure.

The present invention is directed to overcoming one or more of the problems discussed above.

SUMMARY OF THE INVENTION

In one aspect, the invention provides a water dispenser for attachment to an animal cage or the like which dispenser includes a bottle with a closeable access opening for enabling filling of the bottle, a drinking tube which extends out from the bottle and which communicates with the interior of the bottle and means for attaching the bottle to the cage or the like. The access opening is situated in a front wall of the bottle that faces the cage or the like when the water dispenser is attached thereto.

In another aspect of the invention, the dispenser further includes a component which protrudes outward from the front wall of the bottle to maintain the front wall in a spaced apart relationship with the cage or the like.

In still another aspect of the invention, the bottle and the component which protrudes outward from the front wall of the bottle are formed of different materials, the component being formed of a material which is more resistant to gnawing than the material of the bottle.

In still another aspect of the invention, the component which protrudes from the front wall of the bottle is a closure for the access opening.

In another aspect of the invention, the bottle has an annular rim portion encircling the access opening and a closure cap which engages on the rim portion and which protrudes outward from the front wall of the bottle. The means for attaching the bottle to the cage or the like includes a curved hanger rod which extends around the underside of the rim portion of the bottle and which has hooked upper ends which extend outward in order to engage the cage or the like.

In another aspect of the invention, the bottle has side walls each of which has a hand grip recess that extends in a substantially parallel relationship with the back wall of the bottle.

In a further aspect, the invention provides a water dispenser for attachment to an animal cage or the like which dispenser includes a plastic bottle having an access opening situated at a front wall of the bottle and having a threaded annular rim which encircles the access opening and which extends outward from the front wall. The rim has a groove which extends around at least the sides and underside of the rim. A resilient hanger rod extends along the groove and has hooked upper ends which extend outward from the bottle for engagement with the cage or the like. A metal closure cap has threads which engage the threaded rim of the bottle.

The invention provides a water dispenser for use at animal cages in which the access opening for filling the bottle is situated at the front wall of the bottle that faces the cage or the like. In the preferred form, a closure cap for the opening is formed of material that is harder than the material of the bottle and protrudes from the bottle to abut the cage or the like and thereby hold the bottle in a spaced apart relationship with the cage. This prevents damaging of the bottle by gnawing or clawing. In the preferred form, the bottle is securely fastened to the cage by a resilient hanger rod which clasps a rim at the access opening and hooks the wall of the cage or the like. The bottle may have hand grip recesses in its side walls which are adjacent a portion of the back wall that is of reduced width, thereby facilitating gripping of the bottle.

The invention, together with further aspects and advantages thereof, may be further understood by reference to the following description of the preferred embodiment and by reference to the accompanying drawings.

BRIEF DESCRIPTION OF THE DRAWINGS

FIG. 1 is a perspective view of a water dispenser in accordance with the preferred embodiment of the invention.

FIG. 2 is a partially broken out side view of the water dispenser of FIG. 1, the dispenser being attached to the wall of an animal cage.

FIG. 3 is a cross section view of the water dispenser taken along line 3—3 of FIG. 2.

DETAILED DESCRIPTION OF THE PREFERRED EMBODIMENTS

Referring jointly to FIGS. 1, 2 and 3 of the drawings, a water dispenser 11 in accordance with this embodiment of the invention includes a bottle 12 which in use is disposed at a wall 13 of a cage 14 or other type of animal enclosure such as a fence for example. A hollow drinking tube 16 at the lowermost region of the bottle 12 extends a short distance into the cage 14 or the like through one of the openings 17 which are typically present in the walls of cages 14.

The bottle 12 of this example has a generally rectangular shape, with rounded corners, although other configurations are also suitable. Herein and in the appended claims, the wall of the bottle 12 which faces cage 14 will be termed the front wall 18 and the opposite wall will be termed the back wall 19. Other portions of the bottle form a top wall 21, bottom wall 22 and side walls 23. The bottle 12 including the several walls 18, 19, 21, 22 and 23 may be an integral body of high strength, light weight plastic, formed by blow molding for example, although other materials and methods of manufacture can also be appropriate.

Bottle 12 is formed with a nipple 24 which extends downward and outward from the junction of front wall 18 and bottom wall 22. The drinking tube 16 extends into nipple 24 and is secured in place by a resilient annular clamp 26 of the hose clamp type which encircles the nipple and drinking tube. Tube 16 is formed of a hard material, such as stainless steel for example, which is resistant to gnawing by animals. Although it is not essential in all instances, tube 16 preferably contains a ball 27 which is of smaller diameter than the inside diameter of the tube and which seats against an in turned lip 28 at the tip of the tube to inhibit leakage and evaporation of water. Another lip 29 which is within the tube 16 blocks travel of the ball 27 into the bottle 12 when the bottle is in other orientations such as during filling of the bottle. Animals quickly learn how to displace the ball 27 from lip 28 in order to allow the release of water.

In contrast to prior water dispensers for animals, the access opening 31 through which the bottle 12 is filled with water is located in the front wall 18 that faces the cage 14, preferably at a location which is centered between the top and bottom walls 21 and 22 and side walls 23. Among other advantages, this facilitates cleaning of the bottle 12 by enabling the opening 31 to be large and by causing the bottle to have a shallow configuration. Preferably the access opening 31 has a diameter which exceeds half of the width of the front wall 18 of bottle 12.

Water dispenser 11 has a component, which is a screw on type of closure cap 32 in this example, that protrudes outward from the front wall 18 of the bottle. This holds the bottle 12 including front wall 18 away from the cage and thereby inhibits gnawing and clawing of the bottle. The closure cap 32 is formed of hard material, such as steel, that is resistant to gnawing.

In this embodiment, the bottle 12 is formed with an annular rim portion 33 which encircles opening 31 and which protrudes outward from front wall 18. External threading 34 on rim portion 33 engages internal threading 36 in closure cap 32 to enable selective engagement and disengagement of the cap. An annular seal 37 within cap 32 bears against a lip 38 at the outer end of rim portion 33 to assure against leakage when the bottle is in the closed condition.

Referring jointly to FIGS. 1, 2 and 3, means 39 for attaching the water dispenser 11 to cage 14 include a curved hanger rod 41 formed of gnaw resistant resilient material such as spring steel for example. Hanger rod 41 has a circular central portion 42, shown in FIG. 2, which extends around the sides and underside of rim portion 33 of bottle 12 at a location adjacent front wall 18. Referring jointly to FIGS. I and 3, upper end portions 43 of rod 41 extend outward from the front wall 18 of bottle 12 and have hooked ends 44 for hooking the water dispenser 11 onto cage wall 13 as shown in FIG. 2.

Referring jointly to FIGS. 2 and 3, a positive and highly secure fastening of the dispenser 11 to cage 14 can be provided for by forming the circular central portion 42 of hanger rod 41 to encircle more than half or 180° of the circumference of rim portion 33 of the bottle. Rim portion 33 has a coaxial circular raised rib 46 which is spaced from front wall 18 to form a groove 47 in which the central portion 42 of hanger rod 41 is seated. This construction causes the hanger rod 41 to clasp the rim portion 33 and makes it necessary to exert force, to distend the hanger rod, in order to separate the hanger rod from bottle 12.

The water dispenser 11 can be manufactured in a variety of sizes to accommodate to animals of different sizes. Smaller sized dispensers 11 can be easily gripped with one hand while the other hand is used to engage or remove closure cap 32 or to clean bottle 12. Referring jointly to FIGS. 1, 2 and 3, one handed gripping of the larger sized units can be facilitated by providing a linear hand grip recess 48 in each side wall 23 of bottle 12 and by reducing the width of back wall 19 at the region 49 where it extends between the recesses. The recesses 48 extend in parallel relationship with back wall 19 and are located adjacent the back wall. As best seen in FIG. 3, this forms two easily gripped edges 49 which extend along opposite sides of the central region of back wall 19 and which are closer together than the side walls 23 of the bottle 12.

As may be seen from the foregoing description of the preferred embodiment, frontal placement of the access opening 31 enables a number of advantages to be realized. The hard closure cap 32 may be used to hold a bottle 12, formed of softer material, away from cage 14 to prevent damaging of the bottle by an animal. The bottle 12 may be more positively and securely attached to the cage 14. The bottle 12 can be shallower to facilitate cleaning without reducing the water holding capacity of the bottle.

While the invention has been described with reference to a single embodiment for purposes of example, many modifications and variations of the water dispenser are possible and it is not intended to limit the invention except as defined in the following claims.

I claim:

1. A water dispenser for attachment to an animal cage or the like, said dispenser having a bottle which has a front wall that faces said cage or the like when said dispenser is attached thereto and wherein said bottle has a closable access opening for enabling filling of the bottle, said dispenser further having a tubular drinking tube spaced from said access opening which extends out from said bottle and which communicates with the interior thereof and means for attaching said bottle to said cage or the like, wherein the improvement comprises:

said access opening being situated at said front wall of said bottle which faces said cage or the like when said dispenser is attached thereto.

2. The water dispenser of claim 1 further including a component which protrudes outward from said front wall of said bottle to maintain said front wall in a spaced apart relationship with said cage or the like.

3. The water dispenser of claim 2 wherein said bottle and said component which protrudes outward from said front wall thereof are formed of different materials, said component being formed of a material which is more resistant to gnawing than the material of said bottle.

4. The water dispenser of claim 2 wherein said component which protrudes from said front wall of said bottle is a closure for said access opening.

5. The water dispenser of claim 4 wherein said bottle has top and bottom surfaces and side surfaces and wherein said access opening and said closure are situated substantially midway between said top and bottom surfaces and substantially midway between said side surfaces.

6. The water dispenser of claim I wherein said bottle has an annular rim portion which encircles said access opening, further including a closure cap which engages on said rim portion of said bottle and which protrudes outward from said front wall of said bottle.

7. The water dispenser of claim 6 wherein said rim portion of said bottle has threads and said closure cap is a screw on cap which engages said threads.

8. The water dispenser of claim 6 wherein said means for attaching said bottle to said cage or the like includes a curved hanger rod extending around the underside of said rim portion of said bottle and having hooked upper ends which extend outward from said bottle in order to engage said cage or the like.

9. The water dispenser of claim 8 wherein said bottle has a groove which extends along at least the bottom region and the side regions of said rim portion of said bottle and wherein said curved hanger rod seats in said groove.

10. The water dispenser of claim 9 wherein said hanger rod is formed of resilient material and extends around more than one half of the perimeter of said rim portion of said bottle.

11. The water dispenser of claim 1 wherein said bottle has a back wall which is spaced apart from said front wall and side walls which extend between said front and back walls and wherein each of said side walls has a hand grip recess extending therealong in substantially parallel relationship with said back wall.

12. The water dispenser of claim 11 wherein the portion of said back wall that is adjacent said hand grip recesses has a width that is smaller than the width of other portions of said back wall.

13. The water dispenser of claim 1 wherein said access opening has a diameter which causes said opening to extend across more than half of the width of said vertically extending first wall of said bottle.

14. The water dispenser of claim 1 wherein said bottle has a threaded annular rim portion which encircles said access opening and which protrudes outward from said front wall and has side walls with hand grip recesses therein, said means for attaching said bottle to said cage or the like being a hanger rod which clasps said rim portion of said bottle and which has hooked upper ends for engaging said cage or the like, said dispenser further having a threaded closure cap which engages on said threaded annular rim portion of said bottle and which abuts said cage or the like when said bottle is attached thereto.

15. The water dispenser of claim 14 wherein said bottle is formed of plastic and said closure cap is formed of metal.

16. A water dispenser for attachment to an animal cage or the like comprising:

a plastic bottle having spaced apart front and back walls, opposite side walls which extend therebetween and top and bottom walls which extend between said front and back walls, said bottle having an access opening situated at said front wall and a threaded annular rim portion which encircles said access opening and which extends outward from said front wall of said bottle, said rim portion having a groove which extends around at least the sides and underside of said rim portion, a resilient hanger rod extending along said groove and having hooked upper ends which extend outward from said bottle for engagement with said cage or the like, and a metal closure cap having threads which engage said threaded annular rim portion of said bottle.

17. The water dispenser of claim 16 wherein said side walls of said bottle each have a hand grip recess which extends in parallel relationship with said back wall of the bottle at locations which are adjacent said back wall and wherein the portion of said back wall that are adjacent the recesses have a width that is smaller than the width of other portions of said back wall.

* * * * *